(12) United States Patent
Nakamura

(10) Patent No.: US 10,140,141 B2
(45) Date of Patent: Nov. 27, 2018

(54) MEASURING ACCUMULATED LOAD VALUES OF FIRST LEVEL AND SECOND LEVEL VIRTUAL MACHINES FOR MODIFYING RESOURCE ALLOCATION

(71) Applicant: HITACHI, LTD., Tokyo (JP)

(72) Inventor: Yoshifumi Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 15/037,353

(22) PCT Filed: Dec. 6, 2013

(86) PCT No.: PCT/JP2013/082800
§ 371 (c)(1),
(2) Date: May 18, 2016

(87) PCT Pub. No.: WO2015/083282
PCT Pub. Date: Jun. 11, 2015

(65) Prior Publication Data
US 2017/0004002 A1    Jan. 5, 2017

(51) Int. Cl.
*G06F 9/455* (2018.01)
*G06F 9/50* (2006.01)
(Continued)

(52) U.S. Cl.
CPC ...... *G06F 9/45558* (2013.01); *G06F 9/45533* (2013.01); *G06F 9/5077* (2013.01);
(Continued)

(58) Field of Classification Search
CPC ............... G06F 11/301; G06F 11/3051; G06F 11/3433; G06F 11/3495;
(Continued)

(56) References Cited

U.S. PATENT DOCUMENTS

2007/0028238 A1* 2/2007 Bennett ............... G06F 9/45558
                                                                         718/1
2007/0203943 A1* 8/2007 Adlung ............... G06F 9/45558
(Continued)

FOREIGN PATENT DOCUMENTS

| JP | 2009-003749 A | 1/2009 |
|---|---|---|
| JP | 2010-500664 A | 1/2010 |
| WO | 2008/102739 A1 | 8/2008 |

OTHER PUBLICATIONS

International Search Report of PCT/JP2013/082800 dated Feb. 4, 2014.

*Primary Examiner* — Eric C Wai
*Assistant Examiner* — Jorge A Chu Joy-Davila
(74) *Attorney, Agent, or Firm* — Mattingly & Malur, PC

(57) ABSTRACT

A computer includes: a host VM monitor configured to operate on a physical processor and generate a logical processor that operates a first-level VM; and a guest VM monitor configured to operate on the logical processor and generate a plurality of virtual processors that operates a plurality of second-level VMs generated on the first-level VM. The host VM monitor includes management information that correlates control information which is unique to each of the second-level VMs and which the host VM monitor can acquire in a period from the start to the end of execution of the second-level VM with a second-level VM identifier for specifying the second-level VM. The host VM monitor specifies a second-level VM, based on a second-level VM identifier corresponding to the control information of the second-level VM, which has been acquired, in the management information and acquires information on a load of the second-level VM.

13 Claims, 18 Drawing Sheets

(51) Int. Cl.
*G06F 11/30* (2006.01)
*G06F 11/34* (2006.01)

(52) U.S. Cl.
CPC ........ *G06F 11/301* (2013.01); *G06F 11/3051* (2013.01); *G06F 11/3433* (2013.01); *G06F 11/3495* (2013.01); *G06F 2009/45591* (2013.01)

(58) Field of Classification Search
CPC ....... G06F 2009/45591; G06F 9/45533; G06F 9/45558; G06F 9/5077
See application file for complete search history.

(56) References Cited

U.S. PATENT DOCUMENTS

| | | |
|---|---|---|
| 2008/0040715 A1 | 2/2008 | Cota-Robles et al. |
| 2009/0007112 A1 | 1/2009 | Moriki et al. |
| 2010/0030877 A1 | 2/2010 | Yanagisawa |
| 2010/0115049 A1* | 5/2010 | Matsunaga ........... G06F 3/0626 709/216 |
| 2010/0115513 A1* | 5/2010 | Moriki ................... G06F 9/463 718/1 |
| 2011/0276742 A1* | 11/2011 | Anand ................ G06F 11/3433 711/102 |
| 2012/0131574 A1* | 5/2012 | Day, II ................ G06F 9/45558 718/1 |
| 2014/0380307 A1* | 12/2014 | Zhu ..................... G06F 9/45533 718/1 |
| 2015/0058265 A1* | 2/2015 | Padala ................ G06N 99/005 706/12 |

* cited by examiner

FIG. 2

| First-level VM identifier | Second-level VM identifier | VMCS pointer |
|---|---|---|
| 0 | 0 | 0xAAAAAAAA |
| 0 | 1 | 0xBBBBBBBB |
| 0 | -(Guest VMM) | 0xCCCCCCCC |
| 1 | - | 0xDDDDDDDD |
| 2 | - | 0xEEEEEEEE |
| -(Host VMM) | - | - |

FIG. 4

| First-level VM identifier | Second-level VM identifier | VMCS pointer |
|---|---|---|
| 0 | - | 0xAAAAAAAA |
| 0 | - | 0xBBBBBBBB |
| 0 | - | 0xCCCCCCCC |
| 1 | - | 0xDDDDDDDD |
| 2 | - | 0xEEEEEEEE |
| -(Host VMM) | - | - |

1111 — First-level VM identifier
1112 — Second-level VM identifier
1113 — VMCS pointer

| First-level VM identifier | Second-level VM identifier | Physical CPU accumulated use period | Execution restart time |
|---|---|---|---|
| 0 | 0 | 100 sec | 11.11.11.11 |
| 0 | 1 | 200 sec | 12.12.12.12 |
| 0 | -(Guest VMM) | 300 sec | 13.13.13.13 |
| 1 | - | 400 sec | 14.14.14.14 |
| 2 | - | 500 sec | 15.15.15.15 |
| -(Host VMM) | - | 600 sec | 16.16.16.16 |

| | First-level VM identifier | Second-level VM identifier | Physical CPU accumulated use period | Execution restart time | Threshold |
|---|---|---|---|---|---|
| 1506 | 0 | 0 | 600 sec | 11.11.11.11 | 500 sec |
| 1507 | 0 | 1 | 200 sec | 12.12.12.12 | 500 sec |
| 1508 | 0 | 2 | 600 sec | 13.13.13.13 | 500 sec |
| 1509 | 0 | -(Guest VMM) | 300 sec | 14.14.14.14 | 600 sec |
| 1510 | 1 | - | 400 sec | 15.15.15.15 | 600 sec |
| 1511 | 2 | - | 500 sec | 16.16.16.16 | 600 sec |
| 1512 | -(Host VMM) | - | 600 sec | 17.17.17.17 | 700 sec |

Columns: 1501, 1502, 1503, 1504, 1505

FIG. 17

| | First-level VM identifier | Second-level VM identifier | Physical CPU accumulated use period | Execution restart time | Threshold |
|---|---|---|---|---|---|
| 1518 | 0 | 0 | 600 sec | 11.11.11.11 | 500 sec |
| 1519 | 0 | 1 | 600 sec | 12.12.12.12 | 500 sec |
| 1520 | 0 | 2 | 600 sec | 13.13.13.13 | 500 sec |
| 1521 | 0 | -(Guest VMM) | 600 sec | 14.14.14.14 | 500 sec |
| 1522 | 1 | - | 400 sec | 15.15.15.15 | 600 sec |
| 1523 | 2 | - | 500 sec | 16.16.16.16 | 700 sec |
| 1524 | -(Host VMM) | - | 600 sec | 17.17.17.17 | 700 sec |

FIG. 18

| | First-level VM identifier | Second-level VM identifier | Physical CPU accumulated use period | Execution restart time | Threshold |
|---|---|---|---|---|---|
| 1530 | | | | | |
| 1531 | 0 | 0 | 600 sec | 11.11.11.11 | 500 sec |
| 1532 | 0 | 1 | 600 sec | 12.12.12.12 | 500 sec |
| 1533 | 0 | 2 | 600 sec | 13.13.13.13 | 500 sec |
| 1534 | 0 | -(Guest VMM) | 700 sec | 14.14.14.14 | 600 sec |
| 1535 | 1 | - | 800 sec | 15.15.15.15 | 600 sec |
| 1536 | 2 | - | 800 sec | 16.16.16.16 | 700 sec |
| | -(Host VMM) | - | 900 sec | 17.17.17.17 | 700 sec |

MEASURING ACCUMULATED LOAD VALUES OF FIRST LEVEL AND SECOND LEVEL VIRTUAL MACHINES FOR MODIFYING RESOURCE ALLOCATION

TECHNICAL FIELD

The present invention relates to measurement of a processor performance in a virtual machine system that executes operation of a second-level virtual machine (VM) on a first-level VM.

BACKGROUND ART

In general, with an increase in the number of servers, the complexity of operation of servers has increased and the operation cost has become an issue. Server integration which is a technique of integrating a plurality of servers into one server is attracting attention as a technique of reducing the operation cost. A virtual machine technique of logically partitioning one computer by a predetermined proportion is known as a technique of realizing server integration. In a virtual machine technique, firmware (or middleware) such as a hypervisor, for example, partitions a physical machine into a plurality of logical partitions (LPARs) and allocates computer resources (typically, processors, memories, and input/output (I/O) devices) to each LPAR so that an operating system (OS) operates on each LPAR. Alternatively, one host OS (an OS that directly uses a physical machine) is executed on one server, and a hypervisor operating on the host OS performs the partition process so that a plurality of guest OSs (OSs operating on the host OS) is operated. The virtual machine technique realizes server integration so that OSs operating in a plurality of servers and software operating on the OSs operate in one server.

Moreover, although the virtual machine technique is a technique which was generally used in a large-scale computer such as a mainframe, the virtual machine technique has come to be used more widely in a low-end server as a result of improvement in performance of microprocessors in recent years. A computer such as a server which employs the virtual machine technique includes a plurality of virtual machines that operates a guest (a generic term of a guest OS and software operating on the guest OS) and a virtual machine monitor (hereinafter referred to as a "VMM") that controls the virtual machines.

A processor that provides and expands a function of supporting VMMs is known. An example of such a processor is an x86 processor, for example. Among processors employed in low-end servers, particularly, the x86 processor provides and expands the function of supporting VMMs, and an x86 server having the x86 processor mounted thereon improves the performance of virtual machines.

For example, the x86 processor has a function of starting a guest operation and an assist function of monitoring the guest operation and suspending the guest operation to call a VMM when a specific event occurs. The assist function is called virtualization technology (VT) in processors of Intel Corporation and is called secure virtual machine (SVM) in processors of Advanced Micro Devices, Inc., for example. Moreover, the start of the guest operation is called "VMENTRY" and the suspension of the guest operation is called "VMEXIT". The assist function can designate an area used for saving and recovery of a guest state. In the processors of Intel Corporation, the area used for saving and recovery of the guest state is included in a data structure called a virtual machine control structure (VMCS) and is referred to from a VMCS pointer in a processor. Similarly, in the processors of Advanced Micro Devices, Inc., the area is included in a data structure called a virtual machine control block (VMCB) and is referred to from a VMCB pointer in a processor.

PTL 1 discloses a virtualization system (hereinafter referred to as a "2-level virtual machine system") which includes a plurality of VMMs (host VMM and guest VMM) and in which the guest VMM that further manages VMs operates on one of the plurality of VMs that are managed by the host VMM. The x86 processor does not support the 2-level virtual machine system. In PTL 1, in order to construct the 2-level virtual machine system, the host VMM emulates the assist function to operate the guest VMM.

CITATION LIST

Patent Literature

[PTL 1]
Japanese Patent Application Publication No. 2009-3749

SUMMARY OF INVENTION

Technical Problem

In a virtual machine system, a physical processor execution period of a VMM and a physical processor execution period of each VM are collected as the performance information of a processor. However, these VMMs do not collect the execution period of processors by taking into account the 2-level virtual machine system. That is, in the 2-level virtual machine system, the host VMM and the guest VMM collect the execution periods of processors. Thus, the host VMM cannot collect the execution period of each of a plurality of VMs (hereinafter referred to as "second-level VMs") under the control of the guest VMM.

That is, in the 2-level virtual machine system disclosed in PTL 1, it is not possible to acquire information for understanding the load or influence on the physical processor, of each second-level VM.

Solution to Problem

A computer according to an aspect of the present invention is a computer that executes operation of two-level virtual machines (VMs) including: a host VM monitor configured to operate on a physical processor and generate a logical processor that operates a first-level VM; and a guest VM monitor configured to operate on the logical processor and generate a plurality of virtual processors that operates a plurality of second-level VMs generated on the first-level VM. The host VM monitor includes management information that correlates control information which is unique to each of the second-level VMs and which the host VM monitor can acquire in a period from the start to the end of execution of the second-level VM with a second-level VM identifier for specifying the second-level VM. The host VM monitor specifies a second-level VM, based on a second-level VM identifier corresponding to the control information of the second-level VM, which has been acquired, in the management information and acquires information on a load of the second-level VM.

Advantageous Effects of Invention

According to the present invention, it is possible to acquire information for understanding the load on the physical processor of each second-level VM.

BRIEF DESCRIPTION OF DRAWINGS

FIG. 2 is a diagram illustrating an example of a VM management table 140.

FIG. 4 is a diagram illustrating an example of the VM management table created in the process of FIG. 3.

FIG. 16 is a diagram illustrating a first example of a performance information table 150 according to Embodiment 2.

FIG. 17 is a diagram illustrating a second example of the performance information table 150 according to Embodiment 2. FIG. 17 is a diagram illustrating a second example of the performance information table 150 according to Embodiment 2.

FIG. 18 is a diagram illustrating a third example of the performance information table 150 according to Embodiment 2.

DESCRIPTION OF EMBODIMENTS

An embodiment of the present invention will be described with reference to the drawings.

In the following description, although information is described in the expression of "xxx table", the information may be expressed in an arbitrary data structure. That is, the "xxx table" may be called "xxx information" in order to indicate that information does not depend on a data structure.

In the following description, there may be cases where processing is described using a "program" as the subject. However, since the predetermined processing is performed while using a storage device (for example, a memory) and/or a communication interface device (for example, a communication port) as necessary when a program is executed by a processor (for example, a central processing unit (CPU)), the processor may also be used as the subject of the processing. Processing described using the program as the subject may be processing performed by the processor or a system having the processor. Moreover, a processor may be the CPU itself and may include a hardware circuit that performs a part or all of the processes performed by the processor. A program may be installed from a program source. The program source may be a program distribution computer or a storage medium, for example. The program distribution server may be a management computer.

Embodiment 1

In the present embodiment, an example is illustrated in which the use period of a physical processor is measured by a first-level VM and a second-level VM of VMs constructed in a 2-level nested structure of first and second-level VMs, a host VMM, and a guest VMM. Here, the first-level VM and the second-level VM are virtual machines operating on a physical machine 300 and form a nested structure in which the second-level VM operates on the first-level VM.

Figure 1:
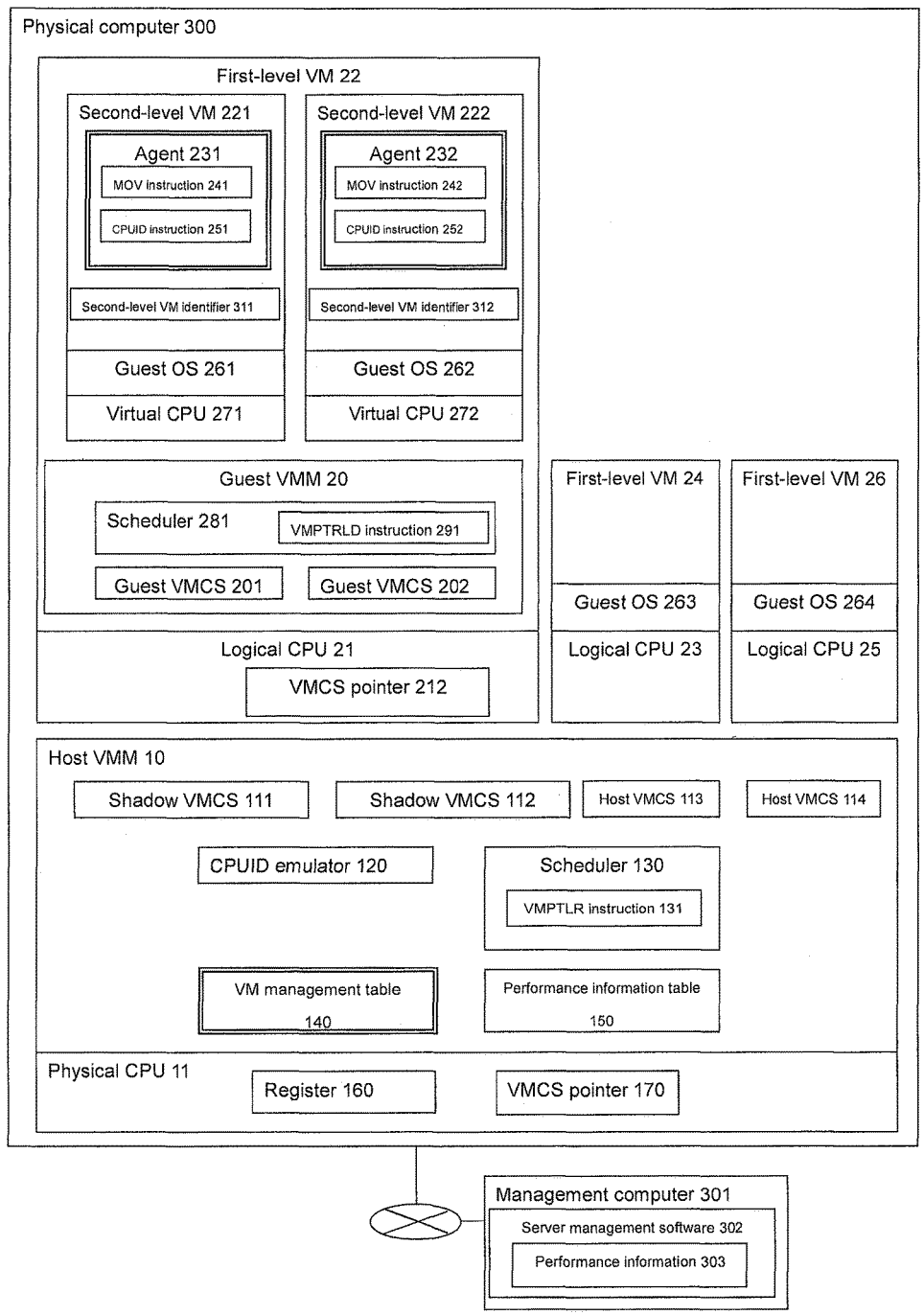
FIG. 1 is a block diagram of a computer system according to Embodiment 1.

FIG. 1 is a block diagram of a computer system according to Embodiment 1.

The computer system includes a physical machine 300 and a management computer 301.

The physical machine 300 is an example of a 2-level virtual machine system. The physical machine 300 includes a memory (not illustrated) that stores data and programs and an input/output (I/O) device (not illustrated) for transmitting receiving data to and from an external device of the physical machine 300 in addition to a physical CPU 1 that includes a virtualization support function and executes an arithmetic process. The physical CPU 11 is connected to the memory and the I/O device. The I/O device is a network interface, a host bus adapter, or the like, for example. The physical CPU 11 may be configured as a plurality of processors and may be configured as a processor having a plurality of arithmetic cores.

In the present embodiment, the "virtualization support function" includes a function of starting a guest operation and an assist function of monitors the guest operation and suspending the guest operation to call a virtual machine monitor (VMM) when a specific event occurs.

The physical machine includes the physical CPU 11, and the physical CPU 11 includes a register 160 and a VMCS pointer 170. The virtual machine system includes a first virtual machine monitor (host VMM 10) that provides a virtual machine (VM), virtual machines (first-level VMs 22, 24, and 26) operating on the first virtual machine monitor, a second virtual machine monitor (guest VMM 20) operating on a virtual machine, and virtual machines (second-level VMs 221 and 222) operating on the second virtual machine monitor.

Operation of the host VMM 10 is executed by the physical machine 300. The host VMM 10 converts physical resources of the physical machine 300 to virtual resources and allocates the virtual resources to the respective first-level VMs 22, 24, and 26 in order to operate the plurality of first-level VMs 22, 24, and 26. In the present embodiment, the host VMM 10 is a hypervisor as an example of a virtualization mechanism.

Here, the resources of a physical CPU are logically partitioned into logical CPUs regardless of a physical configuration. The logical CPU is created by a host VMM and a physical CPU is dynamically allocated to the logical CPU by the control of the host VMM. The logical CPU emulates the physical CPU. A virtual CPU is created by a guest VMM and a logical CPU is dynamically allocated to the virtual CPU by the control of the guest VMM. The virtual CPU is allocated to a second-level VM and emulates the logical CPU.

The host VMM 10 operates the first-level VMs 22, 24, and 26 and the guest VMM 20 using the logical CPUs 21, 23, and 25 that are emulating the physical CPU 11. Moreover, the guest VMM 20 operates the second-level VMs 221 and 222 using virtual CPUs 271 and 272 that are emulating the logical CPU 21.

The host VMM 10 includes a VM management table 140 for identifying the second-level VMs 221 and 222 and a performance information table 150 for recording the use period of the physical CPUs of VMs and VMMs.

The guest VMM 20 includes a scheduler 281 that switches the VMCS pointers of the second-level VMs 221 and 222 and a guest VMCS 201 corresponding to the second-level VM managed by the guest VMM 20. Guest Oss 261 and 262 operate on the second-level VMs 221 and 222, and a plurality of applications can be operated on the guest Oss 261 and 262. Agents 231 and 232 are examples of the applications.

In the present embodiment, although the host VMM 10 is a program executed by the physical CPU 11 as an example, a part or all of the functions of the host VMM 10 may be realized by a hardware circuit as another example.

Since a technique of allocating to respective first-level VMs virtual resources (for example, a virtual CPU, a virtual memory, and a virtual I/O device) based on the physical resources (for example, the physical CPU 11, the physical memory, and a physical I/O device) of the physical machine 300 is known, the detailed description thereof will be not provided. Moreover, although the number of first-level VMs is three (see FIG. 1), the number may be one, two, or four or more.

In the first-level VM, a guest OS or a guest VMM is operated.

The first-level VMs 24 and 26 in FIG. 1 illustrate an example in which a guest OS is operated. The guest OSs 263 and 264 operate on the first-level VMs 24 and 26, respectively. An application program is executed on the guest OSs 263 and 264.

The first-level VM 22 in FIG. 1 illustrates an example in which a guest VMM operates. The guest VMM 20 operates on the first-level VM 22, and operation of a plurality of second-level VMs 221 and 222 is executed on the guest VMM 20. The guest OSs 261 and 262 operate on the second-level VMs 221 and 222, respectively, and an application is executed on the guest OSs 261 and 262. In this case, the number of guest OSs and the number of guest VMMs on the first-level VM 22 may be two or more. Moreover, the number of guest OSs on the second-level VM may be two or more. Further, the number of applications executed on the second-level VM may be one or more.

The host VMM 10 creates and manages the first-level VMs 22, 24, and 26. Moreover, the host VMM 10 creates and manages shadow virtual machine control structures (VMCSs) 111 and 112 corresponding to the second-level VMs 221 and 222, respectively, on the first-level VM 22 and host VMCSs 113 and 114 corresponding to the first-level VMs 24 and 26, respectively.

Moreover, the guest VMM 20 creates and manages the second-level VMs 221 and 222 and guest VMCSs 201 and 202 corresponding to the second-level VMs 221 and 222, respectively.

In this way, it is possible to operate the second-level VMs 221 and 222. The guest VMM 20 is a virtual hypervisor, for example.

Here, VMCS is an example of control information of a VM. The VMCS is a set of items of data that stores the state of a virtual CPU or a logical CPU, has a predetermined data structure, and is provided for each virtual CPU and each logical CPU. For example, the VMCS includes an area in which the cause of the occurrence of VMEXIT which is one of state transitions of a physical machine and a register value at the time of occurrence are saved. A VMM performs a process of generating the VMCS and activating or terminating a VM based on the VMCS. Here, the VMCS is the data structure of processors of Intel Corporation, and a data structure corresponding to the VMCS is called a virtual machine control block (VMCB) in the case of processors of AMD Corporation.

A host VMCS is a VMCS managed by a host VMM and is a VMCS for allowing the host VMM to activate a first-level VM. A guest VMCS is a VMCS managed by a guest VM and is a VMCS for allowing the guest VM to activate a second-level VM, and the setting content thereof is reflected on a shadow VMCS as it is. The shadow VMCS is a VMCS managed by a host VM and is a VMCS used during operation of a second-level VM. The setting content of a guest VMCS managed by a guest VMM is reflected on the shadow VMCS as it is. A physical CPU can understand the state of a second-level VM by viewing the setting content of the shadow VMCS.

The host VMM 10 collects the execution period (performance information) of the host VMM 10, the execution periods of the first-level VMs 22, 24, and 26, and the execution periods of the second-level VMs 221 and 222 with respect to the physical CPU 11 and records the collected respective execution periods in the performance information table 150. A configuration and a process for allowing the host VMM 10 to collect the execution periods of the second-level VMs 221 and 222 will be described later.

The performance information table 150 is a table in which the execution periods collected by the host VMM 10 is recorded. When there is a number of physical CPUs 11, the performance information table 150 may be provided for each physical CPU 11. The host VMM 10 may output information recorded in the performance information table 150 to the management computer 301 in response to a request from the management computer 301.

The management computer 301 is connected to the physical machine 300 via a network (for example, the Internet) with the aid of an I/O device. As an example, the management computer 301 is a computer including an I/O device which is an interface device for communication with the physical machine 300, a memory, and a processor connected to the I/O device and the memory. The management computer 301 is realized when the computer executes server management software 302.

A processor of the management computer 301 periodically acquires the information recorded in the performance information table 150 from the host VMM 10 and records the acquired information in the memory as performance information 303. Moreover, the management computer 301 may display information based on the acquired performance information 303. For example, the management computer 301 may include a display device and may display the information based on the performance information 303 on the display device. Alternatively, for example, the management computer 301 may transmit display information based on the performance information 303 to a display computer (not illustrated) which is a remote computer having a display device and display the information on the display device.

Next, an outline of the configuration and the process for allowing the host VMM 10 to collect the execution periods of the second-level VMs 221 and 222 will be described.

As can be understood from FIG. 1, the physical machine 300 includes the host VMM 10 that operates on the physical CPU 11 so as to generate the logical CPUs 21, 23, and 25 that operate the first-level VMs 22, 24, and 26 and a guest VM monitor that operates on the logical CPU 21 so as to generate a plurality of virtual CPUs 271 and 272 that operates a plurality of second-level VMs 221 and 222 generated on the first-level VM 22.

The host VMM 10 has management information (VM management table 140) stored therein in advance in which control information (VMCS pointer) which is unique to each of the second-level VMs 221 and 222 and which can be acquired by the host VMM 10 from the start to the end of execution of the second-level VMs 221 and 222 is correlated with second-level VM identifiers for specifying the second-level VMs 221 and 222. The VMCS pointer is a register indicating the starting address of the VMCS on the physical CPU and the area thereof is fixed. Realtime information is stored in the area so that the information can be acquired from the host VMM 10. The value of the VMCS pointer is set and changed by the scheduler 130. The subject of the processing executed by the physical CPU 11 can be understood from the VMCS pointer. A method of generating the VM management table 140 will be described later.

The host VMM 10 specifies the second-level VMs 221 and 222 by the second-level VM identifiers corresponding to the acquired VMCS pointers of the second-level VMs 221 and 222 from the VM management table 140 and acquires information on the load of the second-level VMs 221 and 222. In this way, it is possible to acquire information for understanding the load or influence on the physical CPU 11, of each second-level VM.

Moreover, when the execution of the second-level VMs 221 and 222 starts or ends, the host VMM 10 specifies a second-level VM of which the execution is to be started or ended based on the VM management table 140 and manages the execution period of the second-level VM. In this way, the host VM monitor can understand the period (execution period) in which each second-level VM uses the physical CPU 11. Although the guest VMM 20 may collect the execution period of the second-level VM, since the execution period collected in this way is not the execution period of a physical CPU but is the execution period of a virtual CPU which is a virtual resource based on the physical CPU, the execution period does not indicate the execution period of the physical CPU accurately. In this respect, the present embodiment can collect the accurate execution period of the physical CPU 11.

In this case, the host VMM 10 records the first-level VM identifiers for specifying the first-level VMs 22, 24, and 26 and the VMCS pointers in the VM management table 140 in advance, and the second-level VMs 221 and 222 cause the host VMM 10 to record the second-level VM identifiers in the VM management table 140 in which the first-level VM identifiers and the VMCS pointers are recorded in advance. In this way, the VM management table 140 is generated.

In this case, the second-level VM 221 (or 222) stores the second-level VM identifier of the second-level VM 221 (or 222) in the register 160 of the physical CPU 11 and then causes the host VMM 10 to read the second-level VM identifier from the register 160 and record the second-level VM identifier in the VM management table 140 in correlation with the VMCS pointer.

More specifically, an agent (Agent 231 (or 232)) for transferring information to the host VMM 10 is incorporated into the second-level VM 221 (or 222). The Agent 231 (or 232) stores the second-level VM identifier in the register 160 by issuing a MOV instruction and causes the host VMM 10 to read the second-level VM identifier from the register 160 by issuing a CPUID instruction. The MOV instruction is an instruction for storing data on a memory in a register and is an instruction which can be executed from an application on an OS. The CPUID instruction is an instruction for checking the performance of a CPU or a support function and is a hardware control instruction with which an application on an OS can be executed under the privilege of a user. The CPUID instruction is emulated by the CPUID emulator 120. With the CPUID instruction, it is possible to read a register value.

According to this configuration, by incorporating the Agent 231 (or 232) capable of executing the MOV instruction and the CPUID instruction into the second-level VM 221 (or 222), it is possible to manage the execution period of the second-level VM.

Upon receiving the CPUID instruction from the Agent 231 (or 232) of the second-level VM 221 (or 222) which is executing processing, the host VMM 10 reads the second-level VM identifier from the register 160, acquires the VMCS pointer, and records the second-level VM identifier in the VM management table 140 in correlation with the VMCS pointer.

FIG. 2 is a diagram illustrating an example of the VM management table 140.

The VM management table 140 is a table which stores information for identifying VMs and in which information for identifying the first-level VM, the second-level VM, the host VMM, and the guest VMM is stored.

The VM management table 140 is created by the host VMM 10. In the VM management table 140, a first-level VM identifier 1101 which is information for identifying the first-level VM and a second-level VM identifier 1102 which is information for identifying the second-level VM and a VMCS pointer 1103 corresponding thereto are set for each VM.

The host VMM 10 identifies the first-level VM 22, the second-level VMs 221 and 222, and the guest VMM 20 from the information supplied from the Agents 231 and 232 and records the information for identifying the same in the VM management table 140.

As for the first-level VM, the VMCS and the first-level VM are managed by the host VMM 10. Thus, it is easy to recognize by which VMCS, the first-level VM is operated, and the host VMM 10 can easily record the VMCS pointer and the first-level VM identifier 1101 in the VM management table 140.

However, as for the second-level VM, the physical CPU 11 executes the second-level VMs 221 and 222 by referring to the copies (called the shadow VMCSs 111 and 112) of the guest VMCSs 201 and 202 created and managed by the guest VMM 20.

The VMCSs (the guest VMCSs 201 and 202) which are the copy sources and the second-level VMs 221 and 222 are created and managed by the guest VMM 20, the guest VMCSs 201 and 202 are reflected on the shadow VMCSs 111 and 112, and the host VMM 10 activates the second-level VMs 221 and 222 by setting the guest state areas of the shadow VMCSs 111 and 112 to the VMCS pointer 170.

Due to this, although the host VMM 10 can understand that operation of a VM executed by the physical CPU 11 is any one of the second-level VMs created by the guest VMM 20, it is not possible to understand which operation of one of the second-level VMs is executed. That is, in operation of the physical CPU 11 and the host VMM 10, although the VMCS pointer of a second-level VM in execution is set to the VMCS pointer 170 on a realtime basis, the host VMM 10 does not execute processing by recognizing a second-level VM of which the VMCS pointer is included in the VMCS pointer 170.

Further, in general, there is no interface such as an instruction for requesting necessary information from the host VMM 10 to the second-level VMs 221 and 222. Thus, in the present embodiment, the Agents 231 and 232 are provided in the second-level VMs 221 and 222, and an interface that transfers the second-level VM identifiers 311 and 312 from the Agents 231 and 232 to the host VMM 10 is provided.

In the present embodiment, the host VMM 10 records the value of the VMCS pointer set to the VMCS pointer 170 during execution of the second-level VM and the second-level VM identifier obtained from the Agent in the second-level VM in execution in the VM management table 140 as illustrated in FIG. 2.

In the example of FIG. 2, the value of the first-level VM identifier of the first-level VM 22 is "0", the value of the first-level VM identifier of the first-level VM 24 is "1", and the value of the first-level VM identifier of the first-level VM 26 is "2". Moreover, the value of the second-level VM identifier of the second-level VM 221 is "0", and the value of the second-level VM identifier of the second-level VM 222 is "1". Moreover, in the first-level VM 22, the value of the VMCS pointer of the second-level VM 221 is "0xAAAAAAAA", the value of the VMCS pointer of the second-level VM 222 is "0xBBBBBBBB", and the value of the VMCS pointer of the guest VMM 20 is "0xCCCCCCCC". Further, the value of the VMCS pointer of the first-level VM 24 is "0xDDDDDDDD" and the value of the VMCS pointer of the first-level VM 26 is "0xEEEEEEEE".

When such a VM management table 140 as illustrated in FIG. 2 is recorded, it is possible to convert the value set to the VMCS pointer 170 to the second-level VM identifier by referring to the VM management table 140. The second-level VM identifier is information which the host VMM 10 and the management computer 301 can use for identification of the second-level VM. In this manner, the host VMM 10 and the management computer 301 can understand the second-level VM which is using the physical CPU 11.

Figure 3:
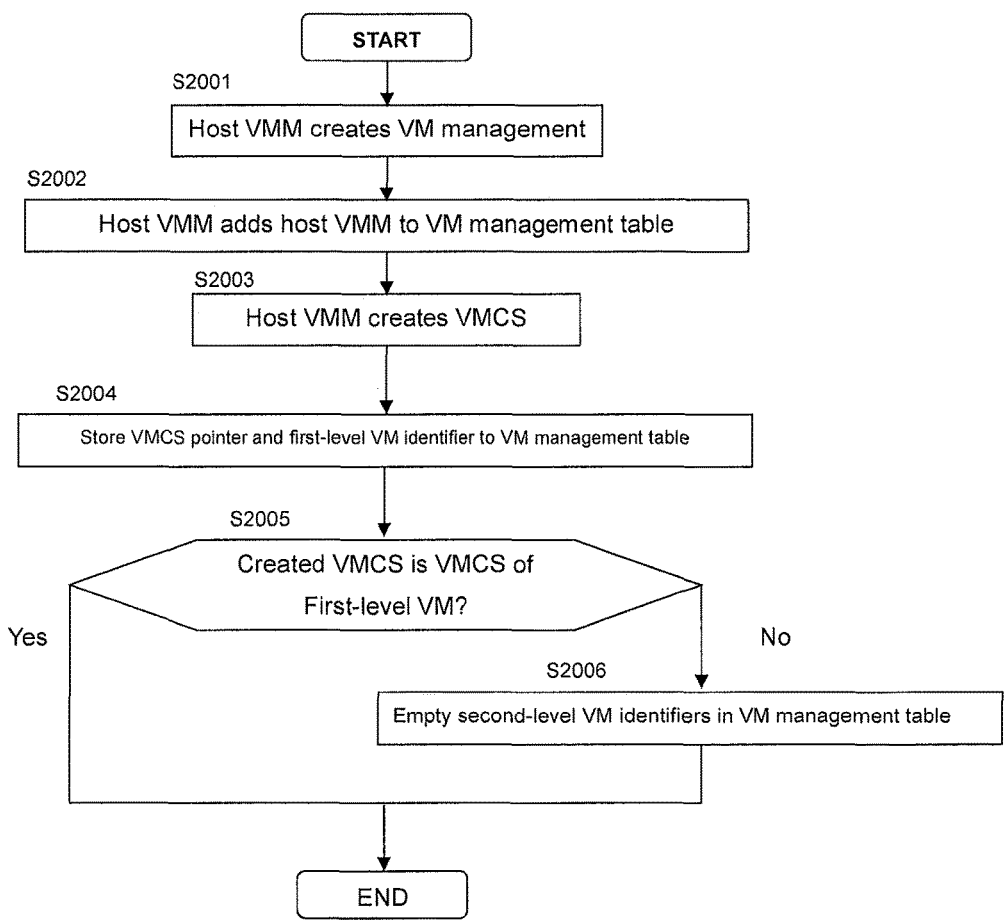
FIG. 3 is a flowchart illustrating a process of creating a VM management table.

FIG. 3 is a flowchart illustrating a process of generating a VM management table. FIG. 4 is a diagram illustrating an example of the VM management table created by the process of FIG. 3. The VM management table 140 is generated before the second-level VMs 221 and 222 are operated and the Agents 231 and 232 are activated.

In step S2001, the host VMM 10 creates an empty VM management table 140. In step S2002, the host VMM generates the row of host VMMs in the VM management table 140.

In step S2003, the host VMM 10 creates a VMCS. In step S2004, the host VMM 10 stores the first-level VM identifier and the VMCS pointer corresponding to the VMCS in the VM management table 140.

As illustrated in FIG. 4, a first-level VM identifier 1111 and a VMCS pointer 1113 only are set. Specifically, values "0", "0", "0", "1", and "2" are set to the field of the first-level VM identifier 1111 from top to bottom, and values "0xAAAAAAAA", "0xBBBBBBBB", "0xCCCCCCCC", "0xDDDDDDDD", and "0xEEEEEEEE" are set to the field of the VMCS pointer 1113 from top to bottom.

Subsequently, in step S2005, the host VMM 10 determines whether the created VMCS is the VMCS of the first-level VM. When it is determined that the created VMCS is not the VMCS of the first-level VM but the shadow VMCS, since it means that a second-level VM is present, the field of the second-level VM identifier of the VM management table 140 is cleared temporarily. The clearing may involve writing all "1" in binary number, for example. In the example of FIG. 4, since the second column represents the second-level VM 221 and the third column represents the second-level VM 222, the fields of the second-level VM identifier 1112 corresponding to the second and third columns are cleared.

In this way, the host VMM 10 can easily correlate the respective first-level VMs that are created and managed by the host VMM 10 itself with the VMCS pointers. By the process of the flowchart illustrated in FIG. 3, it is possible to easily complete the VM management table 140 up to the state illustrated in FIG. 4. Referring to FIG. 4, all necessary items of information such as the first-level VM identifier 1111 and the VMCS pointer 1113 among the items of information included the completed form illustrated in FIG. 2 are stored for the first-level VM. On the other hand, in the case of second-level VMs (that is, when a second-level VM is present on the first-level VM and the guest VMM generates a guest VMCS and a copy of the guest VMCS is present in the shadow VMCS), the host VMM 10 cannot easily know the second-level VM identifier 1112 unlike the first-level VM identifier. Thus, in the stage after the process of FIG. 3 is finished, although the first-level VM identifier 1111 and the VMCS pointer 1113 of the shadow VMCS are stored, the second-level VM identifier 1112 is not stored.

Figure 5:
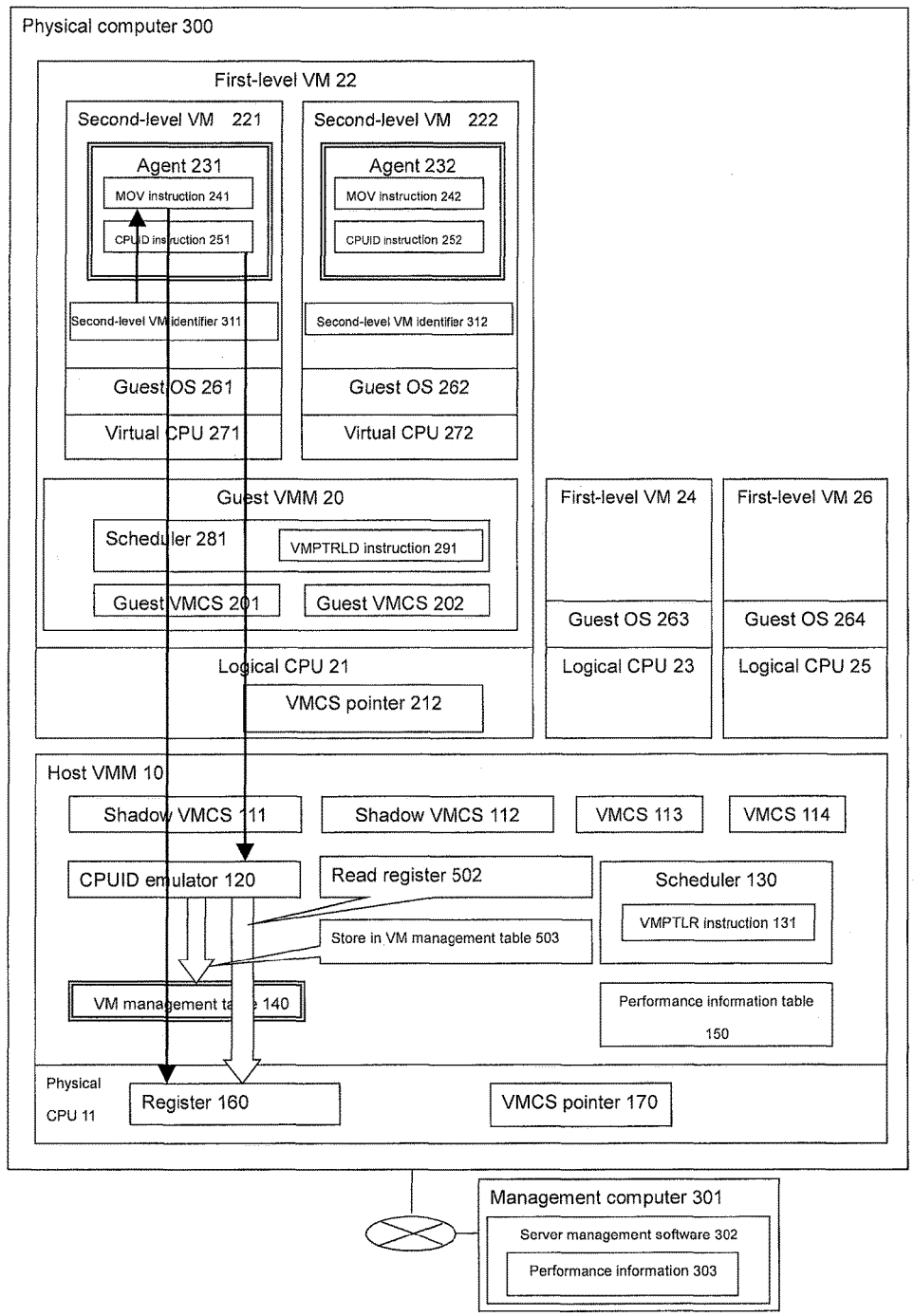
FIG. 5 is a diagram for describing how a second-level VM identifier is stored in a VM management table 140.
Figure 6:
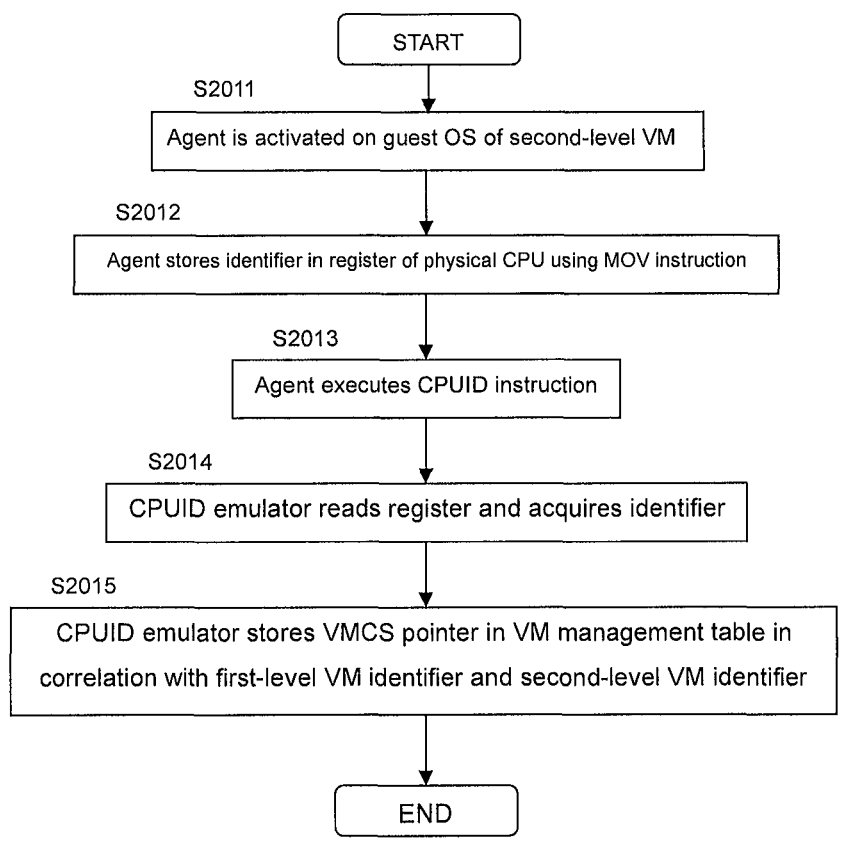
FIG. 6 is a flowchart illustrating a process of recording a second-level VM identifier 1102 in the VM management table 140.

FIG. 5 is a diagram for describing how the second-level VM identifier is stored in the VM management table 140. FIG. 6 is a flowchart illustrating a process of recording the second-level VM identifier 1102 in the VM management table 140. The Agents 231 and 232 operates on the guest OSs 261 and 262 of the second-level VMs 221 and 222 and the second-level VM identifier 1102 is recorded in the VM management table 140.

In step S2011, the Agents 231 and 232 are operated by the guest OSs 261 and 262 on the second-level VMs 221 and 222. In step S2012, when activation is completed, the Agents 231 and 232 execute an instruction of storing the second-level VM identifiers 311 and 312 which are information for identifying the second-level VMs in a storage device. The second-level VM identifier is a unique value that an application operating on a guest OS can acquire.

The second-level VM identifier should not overlap those of second-level VMs managed by the host VMM 10 since the second-level VM identifier is used for allowing the host VMM 10 to identify the second-level VMs 221 and 222. The second-level VM identifiers 311 and 312 may be an IP address possessed by the guest OS in addition to the MAC address of the VM illustrated as an example. The storage device that records the second-level VM identifier may be the register 160 of the physical CPU 11, for example. An instruction of storing the second-level VM identifier in the storage device is a MOV instruction 241, for example.

In step S2013, the Agents 231 and 232 execute an instruction (for example, a CPUID instruction 251) of generating a virtualization exception under the privilege of a user with respect to the host VMM 10. In step S2014, the CPUID emulator of the host VMM 10 having received the instruction reads the value of the register 160 of the physical CPU 11 in response to the instruction.

In step S2015, since the CPUID emulator 120 of the host VMM 10 can recognize the VMCS pointer of the VM in operation by reading the VMCS pointer 170, the host VMM 10 records the second-level VM identifier 311 stored in the register 160 and the VMCS pointer 170 of the second-level VM 221 in which the Agent 231 having executed instructions in steps S2012 and S2013 operates in the VM management table 140 in correlation.

With the process illustrated in the flowchart of FIG. 6, the host VMM 10 can complete such a VM management table 140 as illustrated in FIG. 2.

Next, a method for measuring a physical CPU usage of the second-level VM will be described.

Figure 7:
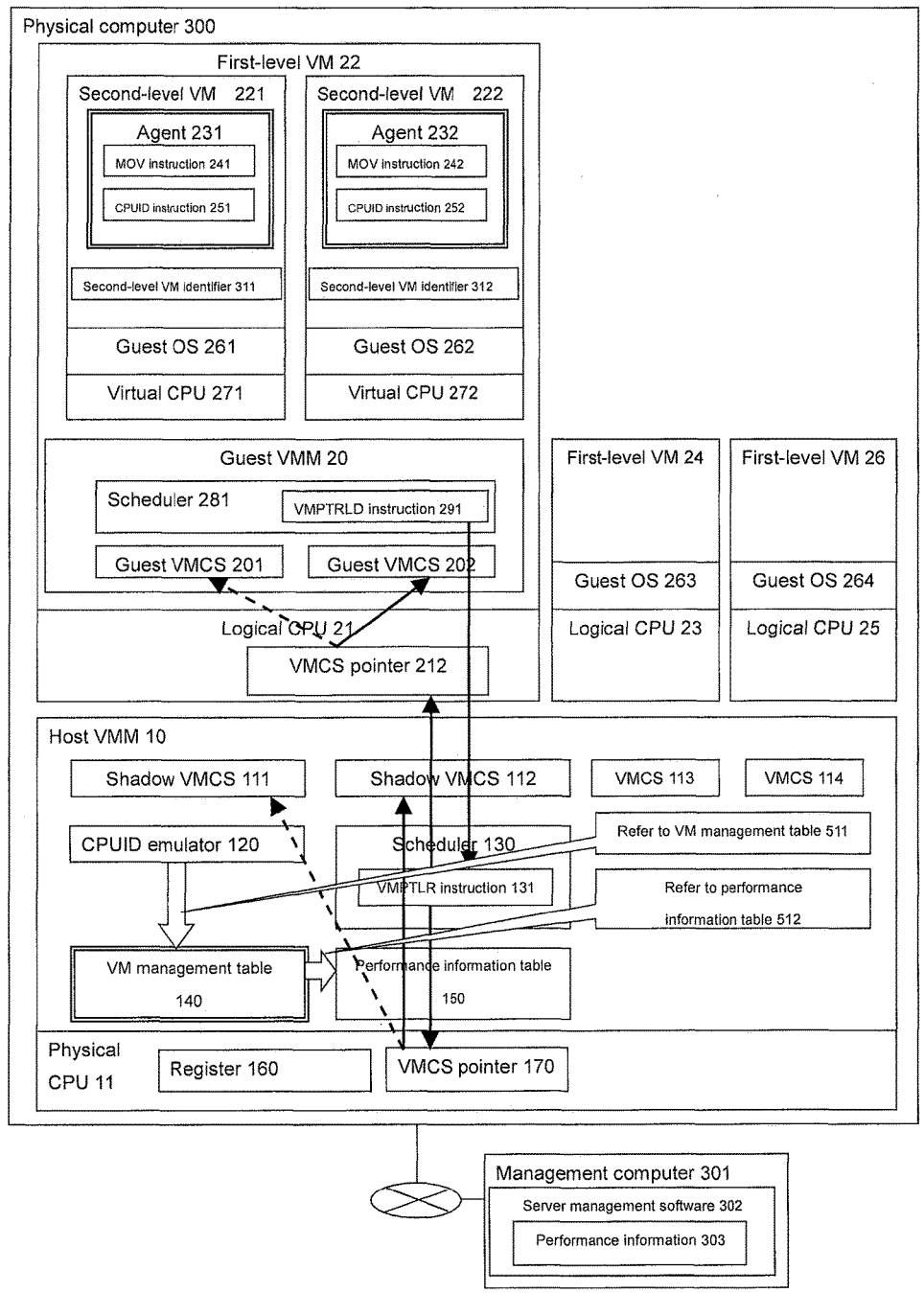
FIG. 7 is a diagram for describing how a CPU usage of a VM is collected.

FIG. 7 is a diagram for describing how a CPU usage of a VM is collected.

Figure 8:
FIG. 8 is a diagram illustrating an example of a performance information table 150.

FIG. 8 is a diagram illustrating an example of the performance information table 150.

Referring to FIG. 8, an accumulated physical CPU use period 1203 and an execution restart time 1204 of a VM indicated by a first-level VM identifier 1201 and a second-level VM identifier 1202 are recorded in the performance information table 150.

The accumulated physical CPU use period 1203 indicates the accumulated use period of the physical CPU 11 by each VM or the like (the first-level VMs 24 and 26, the second-level VMs 221 and 222, the host VMM 10, and the guest VMM 20) in a predetermined period. The predetermined period can be set arbitrarily and is not particularly limited. The use period of the physical CPU 11 is integrated in the predetermined period, and when the predetermined period elapses, the accumulated physical CPU use period 1203 of the performance information table 150 is updated with the accumulated value, and the accumulated value is initialized.

The execution restart time 1204 indicates the time points at which the first-level VMs 24 and 26, the second-level VMs 221 and 222, the host VMM 10, and the guest VMM 20 restart using the physical CPU. The execution restart time 1204 is used for calculating the use period when these elements end using the physical CPU.

Figure 9:
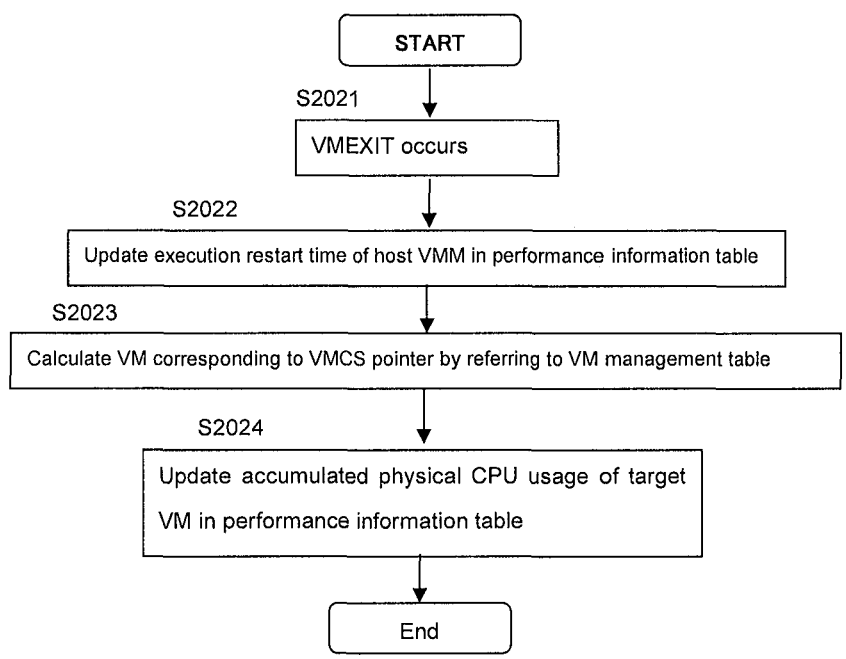
FIG. 9 is a flowchart illustrating a process of updating the performance information table when a VMEXIT occurs.

FIG. 9 is a flowchart illustrating a process of updating the performance information table when a VMEXIT occurs.

In step S2022, the CPUID emulator 120 of the host VMM 10 updates the execution restart time of the host VMM 10 with the present time in response to the occurrence of VMEXIT in step S2021. This is because, when a VMEXIT occurs in a certain VM, a state in which the VM uses the physical CPU 11 transitions to a state in which the host VMM 10 uses the physical CPU 11.

Moreover, in step S2023, the CPUID emulator 120 of the host VMM 10 calculates the first-level VM identifier 1201 and the second-level VM identifier 1202 corresponding to the VMCS pointer 170 of the VM by referring to the VM management table 140. In this way, a VM in which a VMEXIT occurred is specified.

In step S2024, the CPUID emulator 120 of the host VMM 10 adds a time value obtained by subtracting the execution restart time 1204 from the present time to the accumulated physical CPU use period 1203 of the performance information table, of the VM corresponding to the calculated first-level VM identifier 1201 and the calculated second-level VM identifier 1202.

Figure 10:
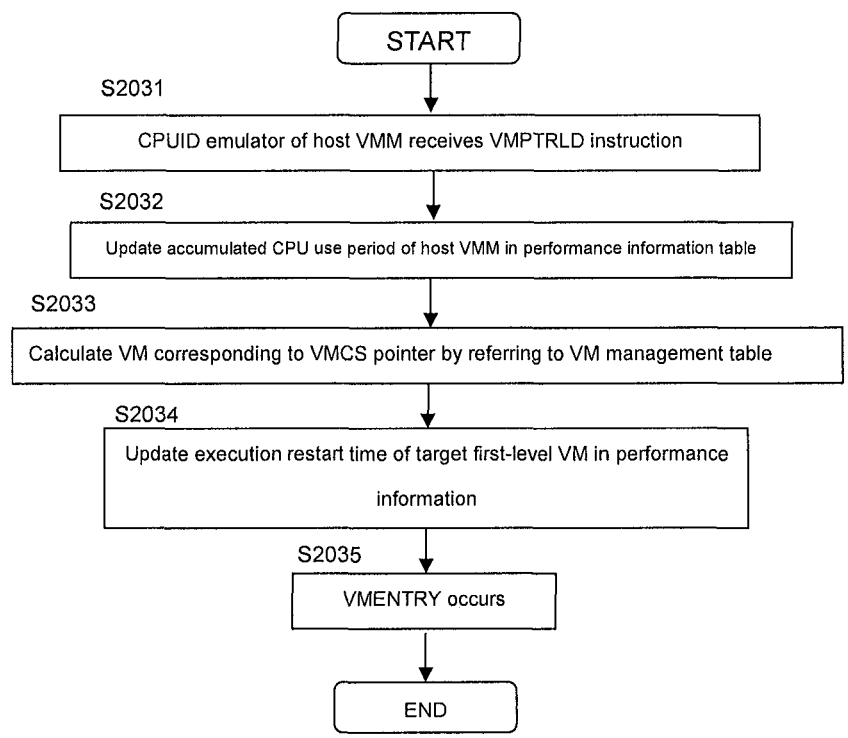
FIG. 10 is a flowchart illustrating a process of updating the performance information table when a VMENTRY occurs.

FIG. 10 is a flowchart illustrating a process of updating the performance information table when a VMENTRY occurs. The performance information table is updated immediately before a VMENTRY occurs. The updating process will be described with reference to FIG. 7.

In the example of FIG. 7, immediately before a VMENTRY occurs, the guest VMM 20 executes a VMPTRLD instruction 291 for setting the starting address of the guest VMCS 202 to the VMCS pointer 212 of the logical CPU 21 in order to activate the second-level VM 222. The VMPTRLD instruction 291 is an instruction of setting a VMCS that is to be used by the VMCS pointer in order to activate a virtual machine.

In step S2031, the scheduler 130 of the host VMM 10 receives the VMPTRLD instruction 291. In response to the VMPTRLD instruction, in step S2032, the CPUID emulator 120 adds a time value obtained by subtracting the execution restart time 1204 from the present time to the accumulated physical CPU use period 1203 in the host VMM field of the performance information table 150.

The scheduler 130 loads the setting of the shadow VMCS 111 to the shadow VMCS 112 using a VMPTRLD instruction 131 to set the VMCS pointer 170. In step S2033, in response to execution of the setting, the CPUID emulator 120 acquires the first-level VM identifier 1201 and the second-level VM identifier 1202 corresponding to the set VMCS pointer 170 from the VM management table 140. In step S2034, the CPUID emulator 120 updates the execution restart time 1204 on the performance information table 150 of the VM corresponding to the acquired first-level VM identifier 1201 and the acquired second-level VM identifier 1202 with the present time. After that, in step S2035, a VMENTRY occurs, and a VM 222 indicated by the starting address corresponding to the VMCS pointer 170 is activated.

Figure 11:
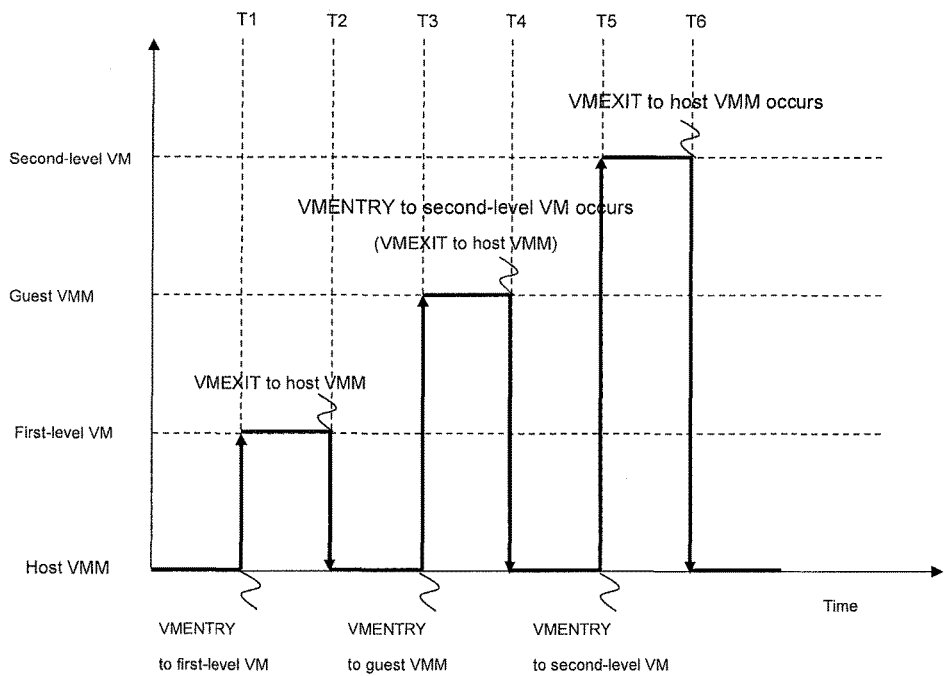
FIG. 11 is a diagram illustrating how a VM or the like which uses a physical CPU 11 transitions.

FIG. 11 is a diagram illustrating how a VM or the like which uses the physical CPU 11 transitions. In the present embodiment, the host VMM 10, the first-level VMs 22, 24, and 26, the guest VMM 20, and the second-level VMs 221 and 222 can use the physical CPU 11.

A VMENTRY occurs at time T1, and in response to this, a state in which the host VMM 10 uses the physical CPU 11 transitions to a state in which the first-level VMs 24 and 26 use the physical CPU 11.

A VMEXIT occurs at time T2, and in response to this, a state in which the first-level VMs 24 and 26 use the physical CPU 11 transitions to a state in which the host VMM 10 uses the physical CPU 11.

A VMENTRY to the guest VMM 20 of the host VMM 10 occurs at T3, and in response to this, a state in which the host VMM 10 uses the physical CPU 11 transitions to a state in which the guest VMM 20 uses the physical CPU 11.

A VMENTRY to the second-level VMs 221 and 222 of the guest VMM 20 occurs at time T4, and in response to this, a VMEXIT emulated by the host VMM 10 occurs. In response to the occurrence of VMEXIT, a state in which the guest VMM 20 uses the physical CPU 11 transitions to a state in which the host VMM 10 uses the physical CPU 11.

A VMENTRY to the second-level VMs 221 and 222 of the host VM 10 occurs at time T5, and in response to this, a state in which the host VMM 10 uses the physical CPU 11 transitions to a state in which the second-level VMs 221 and 222 use the physical CPU 11.

A VMEXIT to the host VM 10 of the second-level VMs 221 and 222 occurs at time T6, and in response to this, a state in which the second-level VMs 221 and 222 use the physical CPU 11 transitions to a state in which the host VMM 10 uses the physical CPU 11.

As illustrated in FIG. 11, the use state of the physical CPU 11 transitions. The performance information table is updated in response to a transition of the use state of the physical CPU 11 based on a VMEXIT to the host VMM 10 or a VMENTRY from the host VMM 10.

In FIG. 11, the period from T2 to T3 and the period from T4 to T5 are the period in which the host VMM 10 uses the physical CPU 11. The period from T1 to T2 is the period in which the first-level VMs 24 and 26 use the physical CPU 11. The period from T3 to T4 is the period in which the guest VMM 20 uses the physical CPU 11. The period from T5 to T6 is the period in which the second-level VMs 221 and 222 use the physical CPU.

According to the present embodiment, the server management software 302 operated by the management computer 301 collects information of the performance information table 150 from the host VMM 10 and records the information as the performance information 303. The physical CPU usages of the first-level VMs 24 and 26, the second-level VMs 221 and 222, the guest VMM 20, and the host VMM 10 can be obtained from the performance information 303.

When the performance information of the physical CPU 11 including both the first-level VMs 24 and 26 and the second-level VMs 221 and 222 is displayed as a graph using these items of performance information 303 collected from the host VMM 10, a server administrator can visually recognize the physical CPU usages of the host VMM 10, the first-level VMs 24 and 26, the guest VMM 20, and the second-level VMs 221 and 222 of the virtual machine system.

Figure 12:
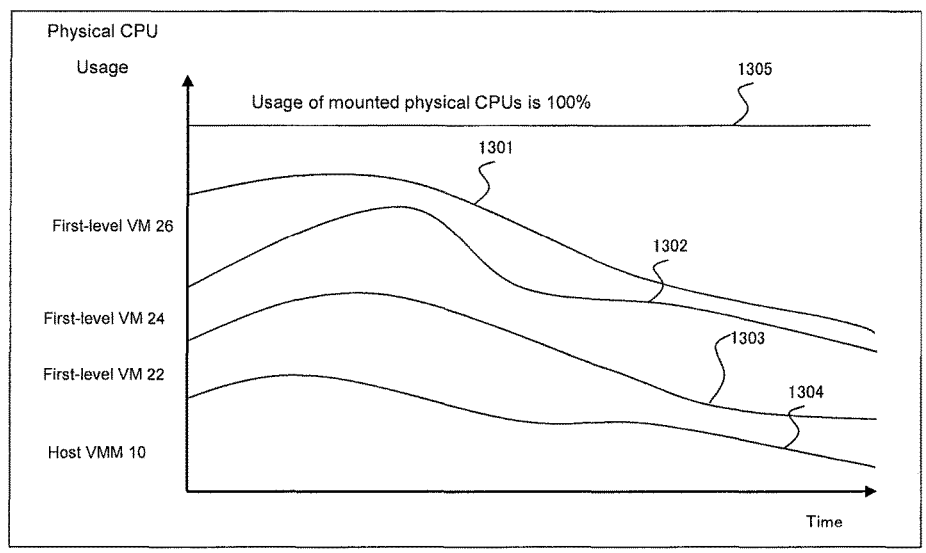
FIG. 12 is an example of a graph illustrating a use state of the physical CPU 11.

FIG. 12 is an example of a graph illustrating the use state of the physical CPU 11. FIG. 12 illustrates the proportions (physical CPU usages) of the use periods of the physical CPU 11 by the host VMM 10 and the first-level VMs 24 and 26 in a time-series manner based on the performance information 303 collected from the host VMM 10. The physical CPU usage indicates how much the accumulated physical CPU use period of the VM and the VMMs obtained from the performance information 303 occupies the entire physical CPU use period per unit time.

A graph 1305 indicates that the usage of the physical CPU 11 mounted on the physical machine is 100%. A graph 1301 indicates the physical CPU usage of the first-level VM 26, a graph 1302 indicates the physical CPU usage of the first-level VM 24, a graph 1303 indicates the physical CPU usage of the first-level VM 22, and a graph 1304 indicates the physical CPU usage of the host VMM 10.

Figure 13:
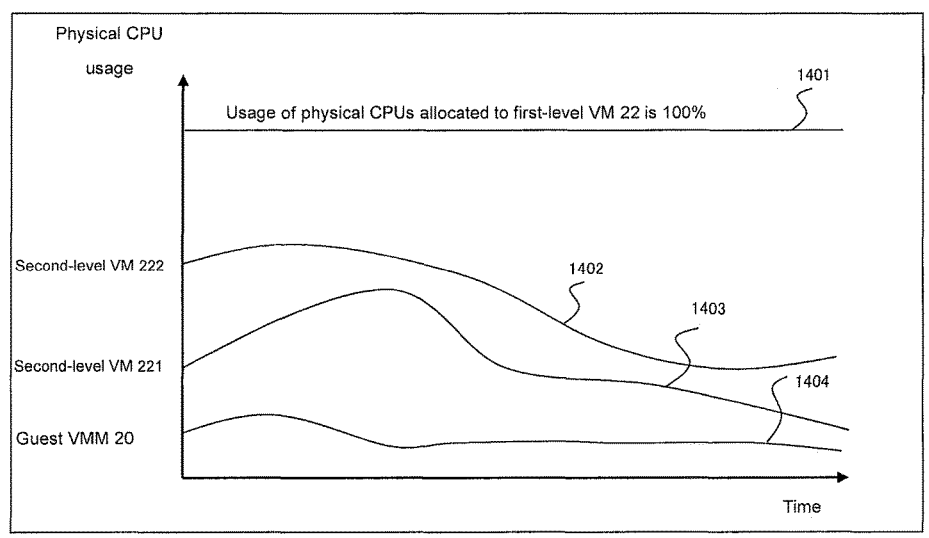
FIG. 13 is a diagram illustrating the details of a physical CPU usage of a first-level VM 22 indicated by a graph 1303 in FIG. 12.
Figure 14:
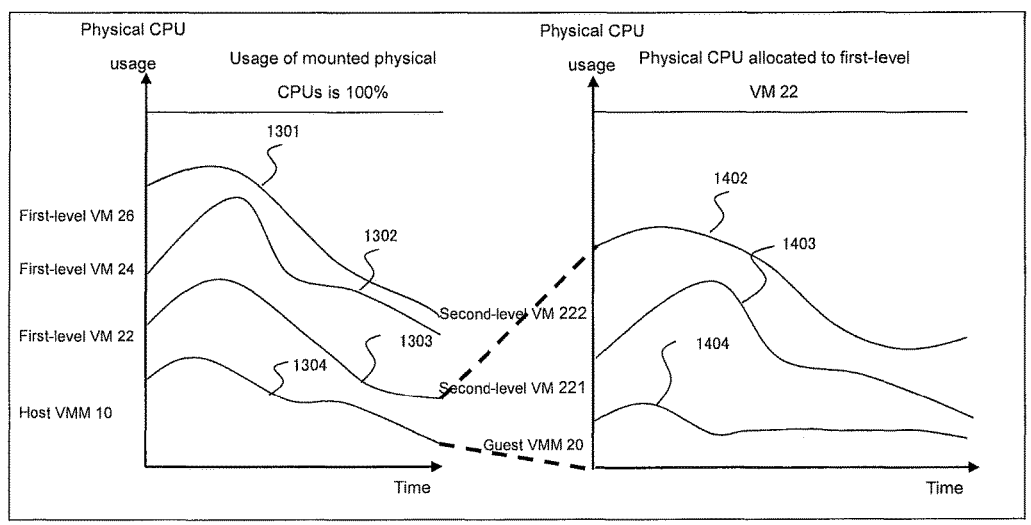
FIG. 14 is a diagram illustrating the relation between the physical CPU usage of a first-level VM illustrated in FIG. 12 and the physical CPU usage of a second-level VM illustrated in FIG. 13.

FIG. 13 is a diagram illustrating the details of the physical CPU usage of the first-level VM 22 indicated by the graph 1303 in FIG. 12. FIG. 14 is a diagram illustrating the relation between the physical CPU usage of the first-level VM illustrated in FIG. 12 and the physical CPU usage of the second-level VM illustrated in FIG. 13.

In a graph 1401 of FIG. 13, the period in which the first-level VM 22 uses the physical CPU 11 is set to 100%. When the use periods of the physical CPU 11 by the second-level VMs 221 and 222 and the guest VMM 20 are summed, the physical CPU use period of the first-level VM 22 is obtained.

A graph 1402 indicates the physical CPU usage of the second-level VM 222, a graph 1403 indicates the physical CPU usage of the second-level VM 221, and a graph 1404 indicates the physical CPU usage of the guest VMM 20.

As described above, when the server management software 302 of the management computer 301 generates and displays such graphs as illustrated in FIGS. 12 and 13 based on the performance information 303 collected from the host VMM 10, the server administrator can visually understand the physical CPU usages of the host VMM 10, the first-level VMs 22, 24, and 26, the guest VMM 20, and the second-level VMs 221 and 222.

As described above, when a VMEXIT or a VMENTRY of the first-level VM occurs, since the host VMM 10 directly manages execution or suspension of the first-level VM, the host VMM 10 can specify the first-level VM identifier. Thus, when a VMEXIT occurs, the period from a VMENTRY to a VMEXIT can be accumulated to the accumulated physical CPU use period 1203 illustrated in FIG. 8 based on the first-level VM identifier.

On the other hand, when a VMEXIT or a VMENTRY of the second-level VM occurs, since the guest VMM 20 directly manages execution or suspension of the second-level VM, the host VMM 10 can specify the value of the VMCS pointer of the second-level VM in execution by viewing the VMCS pointer 170 but cannot specify the second-level VM identifier. Thus, in the present embodiment, the corresponding second-level VM identifier is specified based on the VM management table 140 and the value of the VMCS pointer obtained from the VMCS pointer 170 so that the period from a VMENTRY to a VMEXIT can be accumulated to the accumulated physical CPU use period 1203 in FIG. 8 based on the second-level VM identifier.

That is, according to the present embodiment, the second-level VM identifier that can be identified from the management computer 301 can be notified to the host VMM 10 from the Agents 231 and 232 operating on the second-level VMs 221 and 222, and the host VMM 10 can manage the use period of the physical CPU 11 by each of the second-level VMs in correlation with the second-level VM identifier. Thus, the host VMM 10 can notify the management computer 301 of the use period of the physical CPU 11 by the second-level VM in correlation with the second-level VM identifier that the management computer 301 can recognize. Moreover, in the present embodiment, it is possible to manage the use period of the physical CPU 11 with respect to each of the plurality of second-level VMs 221 and 222 under the control of the guest VMM 20.

Embodiment 2

A basic configuration of a computer system of Embodiment 2 is the same as that of Embodiment 1 illustrated in FIG. 1. Moreover, the computer system of Embodiment 2 basically includes all functions included in the system of Embodiment 1 and further includes functions unique to Embodiment 2. Thus, the operations of the physical machine 300 and the management computer 301 of Embodiment 2 are partially different from those of Embodiment 1. In description of Embodiment 2, the description of the portions common to those of Embodiment 1 will be omitted.

In Embodiment 1, an example in which the performance information (physical CPU usage) described in the performance information table 150 is measured for the host VMM 10, the guest VMM 20, the first-level VMs 22, 24, and 26, and the second-level VMs 221 and 222 and information based on the performance information is displayed has been illustrated. In Embodiment 2, the allocation of logical CPUs or virtual CPUs to the first-level VMs 22, 24, and 26 and the second-level VMs 221 and 222 is changed based on the performance information of the performance information table 150.

The host VMM 10 manages the loads (execution periods) of the first-level VMs 22, 24, and 26 and the second-level VMs 221 and 222 and sets the allocation of logical CPUs or virtual CPUs to the first-level VMs 22, 24, and 26 or the second-level VMs 221 and 222 based on the execution periods of the first-level VMs 22, 24, and 26 and the second-level VMs 221 and 222. In this way, the host VMM 10 can appropriately adjust the allocation of logical CPUs and virtual CPUs according to the execution period of each VM. As a specific example, the host VMM 10 calculates accumulated values of the execution periods of the first-level VMs 22, 24, and 26 and the second-level VMs 221 and 222 every predetermined period, compares the respective accumulated values with a predetermined threshold, and sets the allocation of logical CPUs or virtual CPUs to the first-level VMs 22, 24, and 26 or the second-level VMs 221 and 222 based on the comparison result. As another example, the host VMM 10 requests the management computer 301 managing the physical machine 300 to set the allocation of logical CPUs and virtual CPUs to the first-level VMs 22, 24, and 26 or the second-level VMs 221 and 222 and the management computer 301 sets the allocation.

Figure 15:
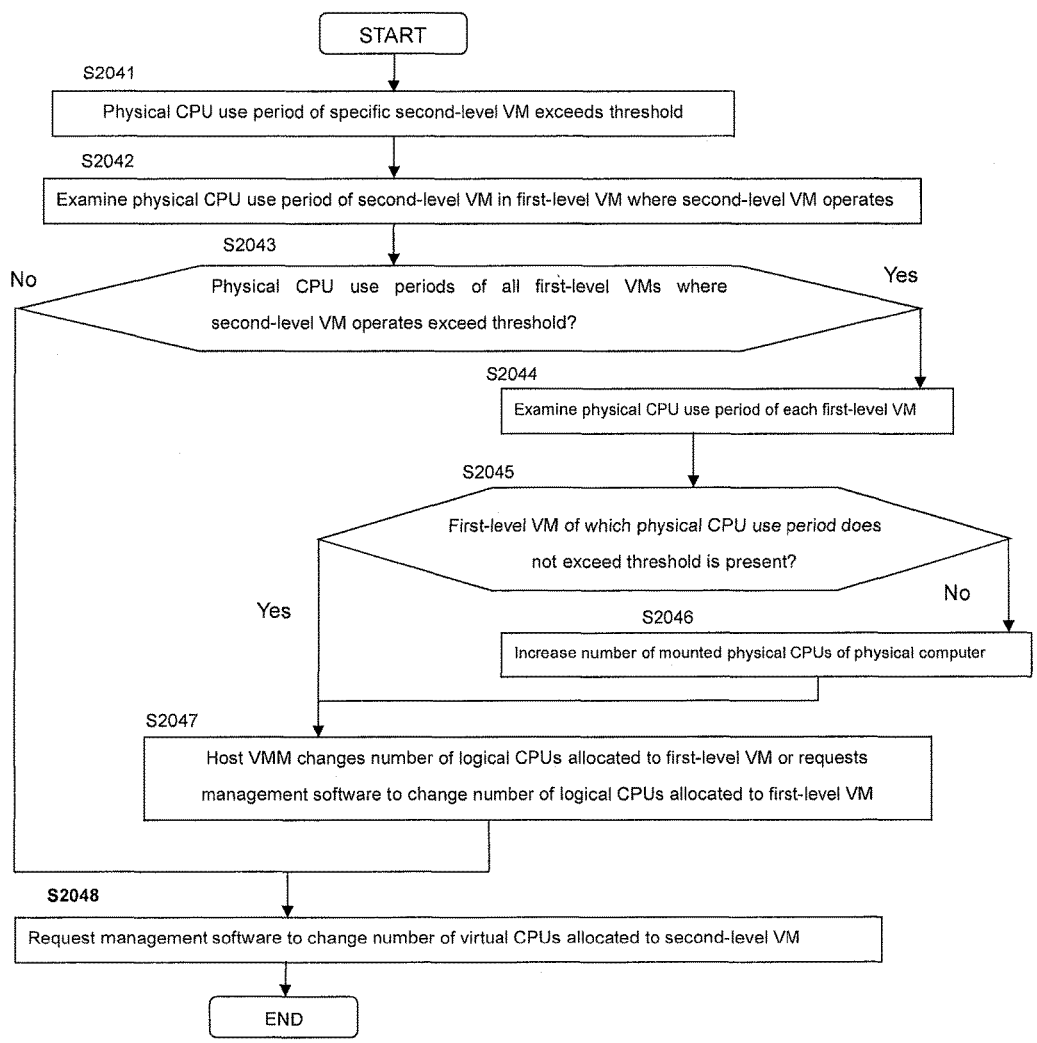
FIG. 15 is a flowchart illustrating a process in which a host VMM 10 sets allocation of logical CPUs or virtual CPUs to the first-level VMs 22, 24, and 26 or the second-level VMs 221 and 222 according to Embodiment 2.

FIG. 15 is a flowchart illustrating a process in which the host VMM 10 sets the allocation of logical CPUs or virtual CPUs to the first-level VMs 22, 24, and 26 or the second-level VMs 221 and 222 according to Embodiment 2. FIGS. 16 to 18 are tables illustrating an example of the performance information table 150 according to Embodiment 2.

Referring to FIGS. 16 to 18, a threshold is further stored in the performance information table 150 of Embodiment 2 in addition to the same first-level VM identifier, the same second-level VM identifier, the same accumulated physical CPU use period, and the same execution restart time as those of the performance information table 150 of Embodiment 1 illustrated in FIG. 8. The threshold is a threshold for the accumulated physical CPU use period (hereinafter also referred to simply as a "physical CPU use period"). When an accumulated physical CPU use period of a certain VM exceeds the threshold, it indicates that the allocation of CPUs to the VM is deficient.

The threshold is a threshold for comparing with the accumulated physical CPU use period measured at predetermined time intervals and determining deficiency of the allocation of CPUs. This threshold may be set in common to all virtual machines and may be set to individual VMs.

Referring to FIG. 15, first, upon detecting that the physical CPU use period of a specific second-level VM exceeds the threshold in step S2041, the host VMM 10 examines the physical CPU use period of another second-level VM in the first-level VM in which the second-level VM operates in step S2042. Moreover, the host VMM 10 determines whether the physical CPU use period of the first-level VM in which the second-level VM operates exceeds the threshold.

When the physical CPU use period of the first-level VM does not exceed the threshold, the host VMM 10 requests the server management software 302 of the management computer 301 to change the number of virtual CPUs to be allocated to the second-level VM in step S2048. Specifically, the number of virtual CPUs allocated to the second-level VM of which the physical CPU use period exceeds the threshold may be increased.

Moreover, when the physical CPU use period of the first-level VM exceeds the threshold in step S2043, the host VMM 10 examines the physical CPU use periods of all first-level VMs in step S2044. Subsequently, in step S2045, the host VMM 10 determines whether a first-level VM of which the physical CPU use period does not exceed the threshold is present.

When a first-level VM of which the physical CPU use period does not exceed the threshold is present, the host VMM 10 changes the number of logical CPUs to be allocated to the first-level VM or requests the server management software 302 of the management computer 301 to change the same in step S2047. Specifically, the logical CPUs allocated to the first-level VM of which the physical CPU use period exceeds the threshold are moved to the first-level VM of which the physical CPU use period does not exceed the threshold. On the other hand, when the first-level VM of which the physical CPU use period does not exceed the threshold is not present, the host VMM 10 sends a request to the server management software 302 of the management computer 301 to increase the number of physical CPUs mounted on the physical machine 300 in step S2046.

As described above, in Embodiment 2, the host VMM 10 changes the allocation of logical CPUs or virtual CPUs from a VM in which the load of the physical CPUs allocated thereto increases to a WI having a low load or requests the server management software 302 of the management computer 301 to change the same. When the number of virtual CPUs or logical CPUs allocated to a VM in which the load increases is increased, the number of physical CPUs that the VM can use increases. For example, since processing performed by one logical CPU or virtual CPU before the number of allocated physical CPUs was increased may be performed by two logical CPUs or virtual CPUs, the load is reduced.

Hereinafter, several operation examples will be described.

FIG. 16 is a diagram illustrating a first example of the performance information table 150 according to Embodiment 2. In Embodiment 2, a threshold 1505 for an accumulated physical CPU use period 1503 is set in each row of the performance information table 150.

The operation of the host VMM 10 when the performance information table 150 is in the state illustrated in FIG. 16 will be described.

It is assumed that in step S2041, it is detected that the accumulated physical CPU use period 1503 of a second-level VM (first-level VM identifier=0, second-level VM identifier=0) on the row 1506 illustrated in FIG. 16 is 600 seconds which exceeds 500 seconds in the threshold 1505.

In this case, in step S2042, the host VMM 10 examines whether the accumulated physical CPU use period 1503 of each second-level VM (second-level VM identifier=1, 2) operating on a first-level VM (first-level VM identifier=0) appearing in the row 1509 of FIG. 16 exceeds the threshold 1505. The examination target includes a second-level VM (second-level VM identifier=1) on the row 1507 and a second-level VM (second-level VM identifier=2) on the row 1508.

Subsequently, in step S2043, the host VMM 10 examines whether the accumulated physical CPU use period 1503 of a first-level VM (first-level VM identifier=0) in which the second-level VM (first-level VM identifier=0, second-level VM identifier=0) of which the accumulated physical CPU use period 1503 is detected to exceed the threshold 1505 in step S2041 does not exceed the threshold 1505. In this example, it is determined whether the accumulated physical CPU use period 1503 of any one of the second-level VM and the guest VMM operating on the first-level VM (first-level VM identifier=0) does not exceed the threshold 1505. In the example of FIG. 16, it is examined whether the accumulated physical CPU use period 1503 of any one of the second-level VM (second-level VM identifier=0, 1, 2) and the guest VMM (second-level VM identifier=–) operating on the first-level VM (first-level VM identifier=0) does not exceed the threshold 1505. The examination result shows that the accumulated physical CPU use period 1503 of one second-level VM (second-level VM identifier=1) and the guest VMM (second-level VM identifier=–) do not exceed the threshold 1505.

Thus, the host VMM 10 proceeds to step S2048 and requests the server management software 302 of the management computer 301 to change the allocation of virtual CPUs. Specifically, the host VMM 10 may send a request to decrease the number of virtual CPUs allocated to the second-level VM (first-level VM identifier=0, second-level VM identifier=2) on the row 1507 of FIG. 16, of which the accumulated physical CPU use period 1503 does not exceed the threshold 1505 and allocate the decreased number of virtual CPUs to the second-level VM (first-level VM identifier=0, second-level VM identifier=0) on the row 1506 of FIG. 16, of which the accumulated physical CPU use period 1503 exceeds the threshold 1505.

FIG. 17 is a diagram illustrating a second example of the performance information table 150 according to Embodiment 2.

In this example, similarly to the example of FIG. 16, it is assumed that in step S2041, it is detected that the accumulated physical CPU use period 1515 of a second-level VM (first-level VM identifier=0, second-level VM identifier=0) on the row 1506 is 600 seconds which exceeds 500 seconds in the threshold 1517. However, in the second example, as illustrated in FIG. 17, it is determined in step S2043 that the accumulated physical CPU use periods of both the second-level VM (second-level VM identifier=0, 1, 2) and the guest VMM (second-level VM identifier=–) operating on the second-level VM (first-level VM identifier=0, second-level VM identifier=0) exceed the threshold. Thus, the flow proceeds to step S2045 through step S2044.

In step S2045, the host VMM 10 determines whether a first-level VM of which the accumulated physical CPU use period does not exceed the threshold is present. In the second example, the host VMM 10 determines in step S2045 that the accumulated physical CPU use period 1515 of the first-level VM (first-level VM identifier=1) on the row 1522 of FIG. 17 does not exceed the threshold 1517. Thus, the host VMM 10 proceeds to step S2047 and changes the allocation of logical CPUs from the first-level VM (first-level VM identifier=1) appearing on the row 1522 to the first-level VM (first-level VM identifier=0) of which the accumulated physical CPU use period exceeds the threshold. Alternatively, the host VMM 10 requests the server management software 302 of the management computer 301 to change the allocation of logical CPUs.

FIG. 18 is a diagram illustrating a third example of the performance information table 150 according to Embodiment 2.

In this example, similarly to the example of FIG. 16, it is assumed that in step S2041, it is detected that the accumulated physical CPU use period 1503 of a second-level VM (first-level VM identifier=0, second-level VM identifier=0) on the row 1506 is 600 seconds which exceeds 500 seconds in the threshold 1505. Moreover, as illustrated in FIG. 18, similarly to the second example of FIG. 17, it is determined in step S2043 that the accumulated physical CPU use periods 1503 of both the second-level VM (second-level VM identifier=0, 1, 2) and the guest VMM (second-level VM identifier=–) operating on the first-level VM (first-level VM identifier=0) in which the second-level VM (first-level VM identifier=0, second-level VM identifier=0) operates exceed the threshold 1505. Thus, the flow proceeds to step S2045 through step S2044.

However, in the third example, as illustrated in FIG. 18, it is determined in step S2045 that the accumulated physical CPU use periods 1527 of all first-level VMs exceed the threshold 1529.

Thus, the host VMM 10 proceeds to step S2046 and sends a request to the server management software 302 of the management computer 301 to increase the number of physical CPUs mounted on the physical machine 300. The management computer 301 displays a request to increase the number of physical CPUs of the physical machine 300. The server administrator increases the number of physical CPUs by viewing the display on the management computer 301.

After that, in step S2047, the host VMM 10 changes the number of logical CPUs to be allocated to the respective first-level VMs or the host VMM 10 sends a request to the server management software 302 to change the number of logical CPUs to be allocated to the respective first-level VMs. Further, in step S2048, the host VMM 10 requests the server management software 302 to change the number of virtual CPUs allocated to the respective second-level VMs.

The above-described embodiments of the present invention are examples for describing the present invention and are not intended to limit the scope of the present invention to these embodiments. The person having ordinary skill in the art can implement the present invention in various other forms without departing from the spirit of the present invention.

REFERENCE SIGNS LIST

1 Physical CPU
10 Host VMM
11 Physical CPU
1101 First-level VM identifier
1102 Second-level VM identifier
1103 VMCS pointer
111 Shadow VMCS
1111 First-level VM identifier
1112 Second-level VM identifier
1113 VMCS pointer
112 Shadow VMCS
113 Host VMCS
120 CPUID emulator
1201 First-level VM identifier
1202 Second-level VM identifier
1203 Accumulated physical CPU use period
1204 Execution restart time
130 Scheduler
131 VMPTRLD instruction
140 VM management table
150 Performance information table
1503 Accumulated physical CPU use period
1505 Threshold
1515 Accumulated physical CPU use period
1517 Threshold
1527 Accumulated physical CPU use period
1529 Threshold
160 Register
170 VMCS pointer
20 Guest VMM
201 Guest VMCS 202 Guest VMCS
21 Logical CPU
212 VMCS pointer
22 First-level VM
221 Second-level VM
222 Second-level VM
231 Agent
24 First-level VM
241 MOV instruction
251 CPUID instruction
26 First-level VM
261 Guest OS
263 Guest OS
271 Virtual CPU
272 Virtual CPU
281 Scheduler
291 VMPTRLD instruction
300 Physical machine
301 Management computer
302 Server management software
303 Performance information
311 Second-level VM identifier
70 VMCS pointer

The invention claimed is:

1. A computer executing operation of two-level virtual machines (VMs), comprising:
a physical processor; and a memory coupled to the physical processor and storing instructions that, when executed by the physical processor, cause the physical processor to execute a host VM monitor,
wherein the host VM monitor is configured to operate on the physical processor and generate a logical processor that operates a first-level VM,
wherein a guest VM monitor is configured to operate on the logical processor and generate a plurality of virtual processors that operate a plurality of second-level VMs generated on the first-level VM,
wherein the host VM monitor is further configured to store management information that correlates a first-level VM identifier specific to the first-level VM and a plurality of control information specific to the respective second-level VMs,
wherein each of the second-level VMs, upon respective activation, is configured to operate an agent to issue a MOV instruction to store a respective second-level VM identifier of the respective second-level VM in a register of the physical processor, and operate the agent to issue a CPUID instruction with respect to the host VM monitor,
wherein the host VM monitor is further configured to, upon receiving the CPUID instruction from the agent of the respective second-level VM, read the respective second-level identifier from the register and store the respective second-level identifier in correlation with the control information specific to the respective second-level VM which issued the CPUID instruction in the management information,
wherein the host VM monitor is further configured to calculate a plurality of accumulated load values for execution periods of the first-level VM and accumulate a period from activating to exiting of the respective second-level VM based on the control information specific to the respective second-level VM stored in a predetermined area of the physical processor different from the register and correlate the accumulated load values with the respective second-level identifier in the management information to determine a load of the respective second-level VM on the physical processor,
wherein the host VM monitor is further configured to, for each of the first-level VM and the second-level VMs on every predetermined period, compare the accumulated load values of the first-level VM and the second-level VM with a predetermined threshold, and
modify the allocation of the logical processor or the virtual processors to the first-level VM or the second-level VMs based on the comparison result.

2. The computer according to claim 1, wherein the control information includes virtual machine control structure (VMCS) pointers or virtual machine control block (VMCB) pointers of the respective second-level VMs.

3. The computer according to claim 1, wherein:
the host VM monitor is further configured to store the first-level VM identifier specific to the first-level VM and the control information in the management information in advance of storing the second-level VM identifiers, and the second-level VMs are configured to be activated thereafter.

4. The computer according to claim 1, wherein the guest VM monitor is configured to store the control information specific to the respective second-level VM in a predetermined area of the logical processor and issue a VMPTRLD instruction to the host VM monitor, and the host VM monitor is configured to transfer the control information specific to the respective second-level VM from the predetermined area of the logical processor to the predetermined area of the physical processor.

5. The computer according to claim 1, wherein the CPUID instruction generates a virtualization exception with respect to the host VM monitor.

6. The computer according to claim 1, wherein the host VM monitor is further configured to manage a load of the first-level VM and modify an allocation of the logical processor and the virtual processors to the first-level VM and the second-level VMs based on the loads of the first-level VM and the second-level VMs.

7. The computer according to claim 6, wherein the host VM monitor is further configured to modify the allocation of the logical processor or the virtual processors to the first-level VM or the second-level VMs by sending a request to a management computer.

8. The computer according to claim 1, wherein the guest VM monitor directly manages operation of the second-level VMs.

9. The method according to claim 1, wherein the CPUID instruction generates a virtualization exception with respect to the host VM monitor.

10. A load measurement method in a computer executing operation of two-level virtual machines (VMs), the method comprising:
operating a host VM monitor on a physical processor to generate a logical processor that operates a first-level VM;
operating a guest VM monitor on the logical processor to generate a plurality of virtual processors that operate a plurality of second-level VMs generated on the first-level VM; and
storing, by the host VM monitor, management information that correlates a first-level VM identifier specific to the first-level VM and a plurality of control information specific to the second-level VMs;
upon activation of each of the second-level VMs, issuing, by an agent of the respective second-level VM, a MOV instruction to store a respective second-level VM identifier of the respective second-level VM in a register of the physical processor, and issuing, by the agent of the respective second-level VM a CPUID instruction with respect to the host VM monitor, upon receiving the CPUID instruction from the agent of the respective second-level VM, reading, by the host VM monitor, the respective second-level identifier from the register and storing, by the host VM monitor, the respective second-level identifier in correlation with the control information specific to the respective second-level VM which issued the CPUID instruction in the management information, calculating, by the host VM monitor, a plurality of accumulated load values for execution periods of the first-level VM, accumulating, by the host VM monitor, a period from activating to exiting of the respective second-level VM based on the control information specific to the respective second-level VM stored in a predetermined area of the physical processor different from the register and correlate the accumulated load values with the respective second-level identifier in the management information to determine a load of the respective second-level VM on the physical processor, comparing, by the host VM monitor, for each of the first-level VM and the second-level VMs on every predetermined period, the accumulated load values of the first-level VM and the second-level VM with a predetermined threshold, and modifying, by the host VM monitor, the allocation of the logical processor or the virtual processors to the first-level VM or the second-level VMs based on the comparison result.

11. The method according to claim 10, wherein the control information includes virtual machine control structure (VMCS) pointers or virtual machine control block (VMCB) pointers of the respective second-level VMs.

12. The method according to claim 10, further comprising:
storing, by the host VM monitor, the first-level VM identifier specific to the first-level VM and the control information in the management information in advance of storing the second-level VM identifiers, and activating the respective second-level VM thereafter.

13. The method according to claim 10, further comprising:
storing, by the guest VM monitor, the control information specific to the respective second-level VM in a predetermined area of the logical processor;
issuing, by the guest VM monitor, a VMPTRLD instruction to the host VM monitor; and
transferring, by the host VM monitor, the control information specific to the respective second-level VM from the predetermined area of the logical processor to the predetermined area of the physical processor.

* * * * *